United States Patent
Chen et al.

(10) Patent No.: US 8,081,440 B2
(45) Date of Patent: *Dec. 20, 2011

(54) PORTABLE COMPUTER AND HINGE MECHANISM THEREOF

(75) Inventors: Min-Feng Chen, Taipei (TW); Chien-Chung Chien, Taipei (TW); Ming-Hui Chen, Taipei (TW); Shu-Hua Yeh, Taipei (TW); Chien-Heng Kuo, Taipei (TW); Yen-Chang Lai, Taipei (TW)

(73) Assignee: Inventec Corporation, Taipei (TW)

( * ) Notice: Subject to any disclaimer, the term of this patent is extended or adjusted under 35 U.S.C. 154(b) by 318 days.

This patent is subject to a terminal disclaimer.

(21) Appl. No.: 12/406,285

(22) Filed: Mar. 18, 2009

(65) Prior Publication Data
US 2010/0134969 A1 Jun. 3, 2010

(30) Foreign Application Priority Data
Nov. 28, 2008 (CN) .......................... 2008 1 0182062

(51) Int. Cl.
*H05K 7/16* (2006.01)
(52) U.S. Cl. ................. 361/679.27; 361/679.02; 16/382
(58) Field of Classification Search ............. 361/679.57, 361/679.58, 679.55, 679.546, 679.01, 679.02, 361/679.22, 679.26, 679.27; 16/382
See application file for complete search history.

(56) References Cited

U.S. PATENT DOCUMENTS

| 5,154,456 A * | 10/1992 | Moore et al. .................. 292/162 |
| 6,826,043 B2 * | 11/2004 | Chang ....................... 361/679.27 |
| 6,836,405 B2 * | 12/2004 | Alfonso et al. ........... 361/679.58 |
| 7,889,487 B2 * | 2/2011 | Chen et al. ............... 361/679.27 |

* cited by examiner

*Primary Examiner* — Jinhee Lee
*Assistant Examiner* — Ingrid Wright
(74) *Attorney, Agent, or Firm* — Bacon & Thomas, PLLC

(57) ABSTRACT

A portable computer and a hinge mechanism thereof are provided. The portable computer includes a display monitor, a host and a hinge mechanism. The hinge mechanism for rotating the display monitor and the host relatively includes a bottom board, a pivot, a power adapter, a locking bracket, a slanting board and a parallel board. The pivot is disposed on the bottom board. Two ends of the pivot are connected with the host and the display monitor respectively. The power adapter is disposed on the bottom board. The locking bracket having a locking hole is disposed on the bottom board. The slanting board disposed on the bottom board slants to the pivot. The slanting board has a first opening which exposes the power adapter. The parallel board disposed on the bottom board is parallel to the pivot. The parallel board has a second opening which exposes the locking hole.

10 Claims, 3 Drawing Sheets

PORTABLE COMPUTER AND HINGE MECHANISM THEREOF

This application claims the benefit of People's Republic of China application Serial No. 200810182062.3, filed Nov. 28, 2008, the subject matter of which is incorporated herein by reference.

BACKGROUND OF THE INVENTION

1. Field of the Invention

The invention relates in general to a portable computer and a hinge mechanism thereof, and more particularly to a portable computer display monitor and host can be rotated relatively and a hinge mechanism thereof.

2. Description of the Related Art

Along with the advance in computer technology, the portable computer is directed towards lightweight, thinness, and compactness. As the functions of the portable computer are almost as good as that of the desktop computer, the portable computer has become a mainstream computer product in the market.

A portable computer includes a display monitor, a host and a hinge mechanism. The hinge mechanism is disposed between the display monitor and the host for rotating the display monitor and the host relatively. The design of the hinge mechanism affects the appearances of the display monitor and the host as well as the disposition of other elements. Thus, how to provide a suitable hinge mechanism has always been one of important focuses to the portable computer.

SUMMARY OF THE INVENTION

The invention is directed to a portable computer and a hinge mechanism thereof. The structural design of the hinge mechanism facilitates the disposition of the elements of the portable computer.

According to a first aspect of the present invention, a portable computer is provided. The portable computer includes a display monitor, a host and a hinge mechanism. The hinge mechanism is connected with the display monitor and the host. The hinge mechanism is for rotating the display monitor and the host relatively. The hinge mechanism includes a bottom board, a pivot, a power adapter a locking bracket, a slanting board and a parallel board. The pivot is disposed on the bottom board. One end of the pivot is connected with the host, and the other end of the pivot is connected with the display monitor. The power adapter is disposed on the bottom board. The locking bracket having a locking hole is disposed on the bottom board. The slanting board is disposed on the bottom board and slants to the pivot. The slanting board has a first opening which exposes the power adapter. The parallel board is disposed on the bottom board and is substantially parallel to the pivot. The parallel board has a second opening which exposes the locking hole.

According to a second aspect of the present invention, a hinge mechanism is provided. The hinge mechanism is connected with a display monitor and a host of a portable computer. The hinge mechanism is for rotating the display monitor and the host relatively. The hinge mechanism includes a bottom board, a pivot, a power adapter, a locking bracket, a slanting board and a parallel board. The pivot is disposed on the bottom board. One end of the pivot is connected with the host, and the other end of the pivot is connected with the display monitor. The power adapter is disposed on the bottom board. The locking bracket having a locking hole is disposed on the bottom board. The slanting board is disposed on the bottom board and slants to the pivot. The slanting board has a first opening which exposes the power adapter. The parallel board is disposed on the bottom board and is substantially parallel to the pivot. The parallel board has a second opening which exposes the locking hole.

The invention will become more apparent from the following detailed description of the preferred but non-limiting embodiments. The following description is made with reference to the accompanying drawings.

DETAILED DESCRIPTION OF THE INVENTION

The invention is exemplified by the embodiments disclosed below. However, these embodiments are for exemplification only, not for limiting the scope of protection of the invention. Also, secondary elements are omitted in these embodiments so as to highlight the technical features of the invention.

Figure 1:
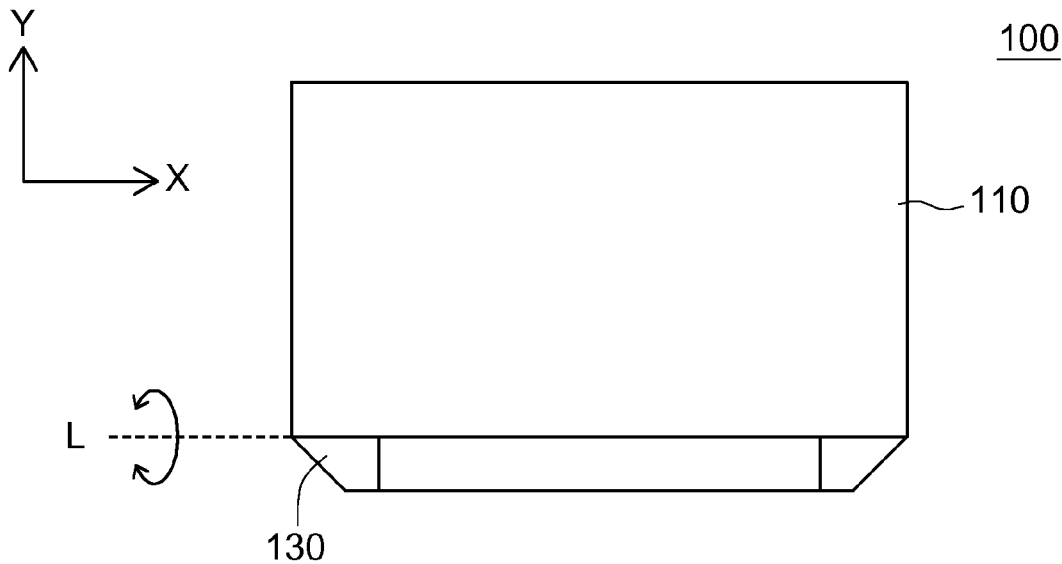
FIG. 1 shows a portable computer of a preferred embodiment of the invention.

Referring to FIG. 1, a portable computer 100 of a preferred embodiment of the invention is shown. The portable computer 100 includes a display monitor 110, a host and a hinge mechanism 130 (the host being blocked by the display monitor 110 is not illustrated in FIG. 1). As indicated in FIG. 1, the hinge mechanism 130 is a trapezoidal structure. The hinge mechanism 130 is connected with the display monitor 110 and the host. The hinge mechanism 130 is for rotating the display monitor 110 and the host along an axial line L relatively.

Figure 2:
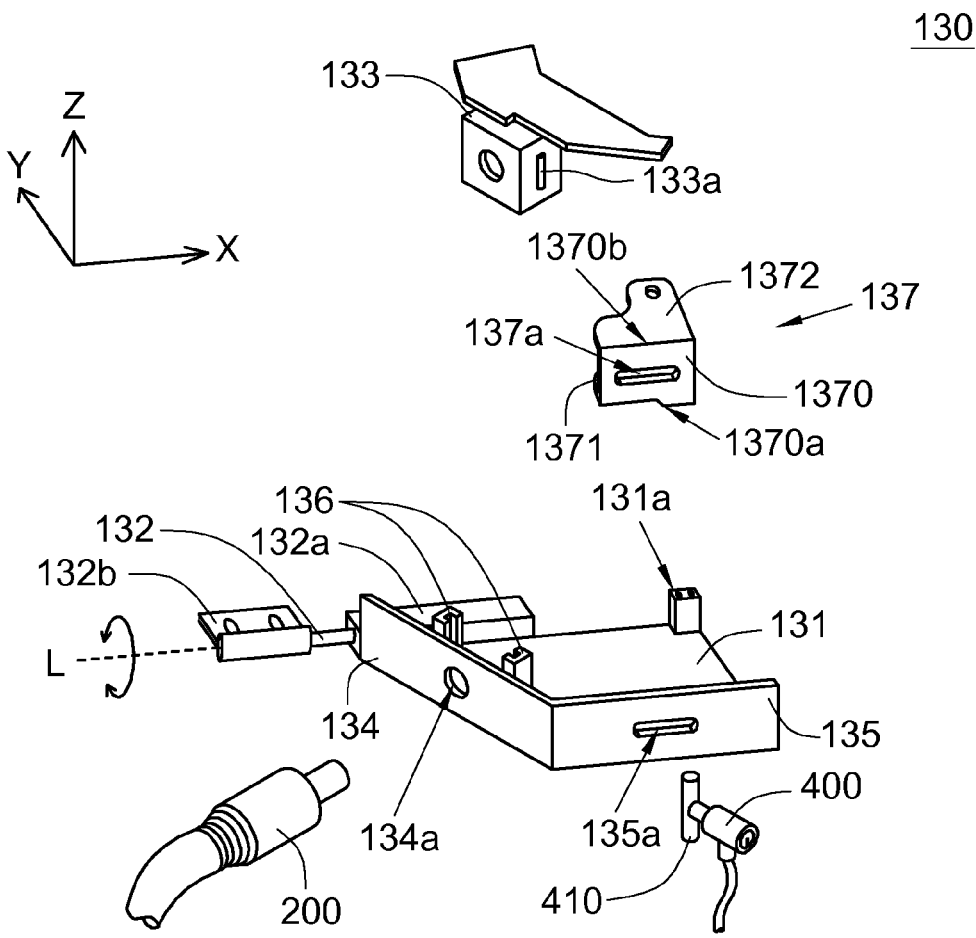
FIG. 2 shows a 3-D diagram of a hinge mechanism.
Figure 3:
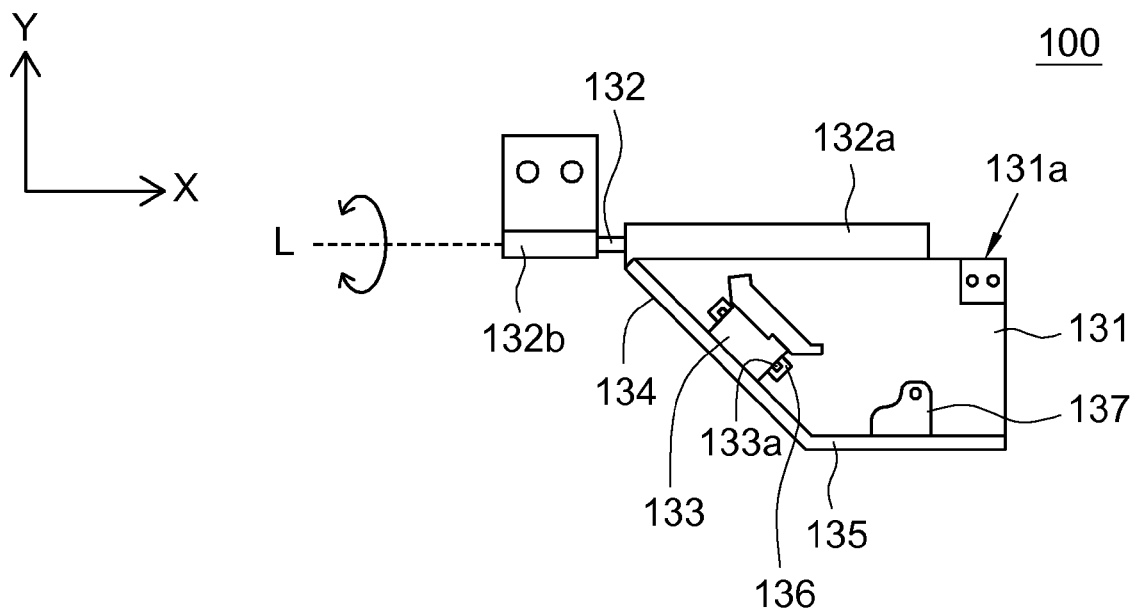
FIG. 3 shows a top view of the hinge mechanism.

Referring to FIGS. 2~3. FIG. 2 shows a 3-D diagram of a hinge mechanism 130, FIG. 3 shows a top view of the hinge mechanism 130. As indicated in FIG. 2, the hinge mechanism 130 includes a bottom board 131, a pivot 132, a power adapter 133, a slanting board 134, a parallel board 135, a sliding-rail structure 136 and a locking bracket 137. The pivot 132 is disposed on the bottom board 131. The first end 132a of the pivot 132 is connected with the host, and the second end 132b of the pivot 132 is connected with the display monitor 110. The first end 132a of the pivot 132 is fixed on the bottom board 131. The bottom board 131 has a locking hole 131a used for screwing the host and the bottom board 131. The second end 132b of the pivot 132 is screwed on the display monitor 110.

When the first end 1 32a of the pivot 132 rotates with respect to the second end 132b, the host and the bottom board 131 are moved together with the first end 132a, and the display monitor 110 is moved together with the second end 132b of the pivot 132. Thus, the display monitor 110 and the host can be rotated relatively.

The parallel board 135 is disposed on the bottom board 131 and is substantially parallel to the pivot 132. The slanting board 134, which slants to the pivot 132, is disposed on the bottom board 131 and connected with the pivot 132 and the parallel board 135. In the present embodiment of the invention, the contained angle between the slanting board 134 and the pivot 132 is substantially 45 degrees. Thus, the parallel board 135, the slanting board 134 and the pivot 132 substantially form a trapezoidal structure. In the present embodiment of the invention, the parallel board 135 and the bottom board 131 are integrally formed in one piece, but the slanting board 134 and the bottom board 131 are separated from each other.

Moreover, the sliding-rail structure 136 is erected on the bottom board 131 for disposing the power adapter 133. During the assembly process, the two protrusions 133a of the power adapter 133 vertically slides into the sliding-rail structure 136, so that the power adapter 133 is firmly disposed on the bottom board 131. However, only one protrusion 133a is illustrated in FIG. 2 due to the restriction of view angle.

The two sliding-rail structures 136 do not necessarily disposed on opposite positions. For example, one sliding-rail structure 136 is closer to the slanting board 134, and the other sliding-rail structure 136 is farther from the slanting board 134. It is assured that the power adapter 133 can correctly slide into the sliding-rail structure 136 as long as the two protrusions 133a of the power adapter 133 correspond to the two sliding-rail structures 136.

Next, the slanting board 134 is assembled on the bottom board 131. Meanwhile, the first opening 134a (illustrated in FIG. 2) of the slanting board 134 exposes the power adapter 133, so that the user can insert the power connecter 200 from the outside of the hinge mechanism 130.

Figure 4:
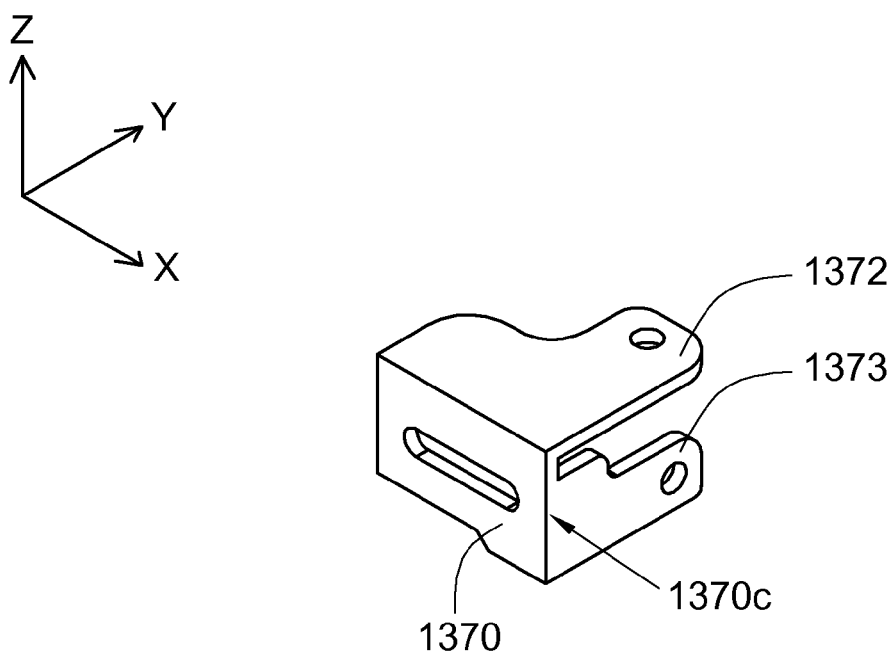
FIG. 4 shows a 3-D diagram of a locking bracket viewed from another view angle.

Referring to both FIG. 2 and FIG. 4. FIG. 4 s shows a 3-D diagram of a locking bracket 137 viewed from another view angle. The locking bracket 137 includes a main board 1370, a first extending board 1371, a second extending board 1372 and a third extending board 1373. The locking bracket 137 is disposed on the bottom board 131. The main board 1370 has a locking hole 137a. The parallel board 135 has a second opening 135a.

When the locking bracket 137 is disposed on the bottom board 131, the main board 1370 and the parallel board 135 are closed together, and the second opening 135a exposes the locking hole 137a of the locking bracket 137. The user can insert the T-shaped locker 410 of the locking chain 400 into the second opening 135a and the locking hole 137a, and rotate the T-shaped locker 410 by 90 degrees, such that the T-shaped locker 410 will not be detached from the locking hole 137a and the second opening 135a. Then, the user can further fix the other end of the locking chain 400 at an unmovable object. Thus, the burglar cannot move the portable computer 100 away.

As indicated in FIG. 2, the first extending board 1371 and the second extending board 1372 are respectively extended from the first lateral side 1370a and the second lateral side 1370b of the main board 1370, both the contained angle between the main board 1370 and the first extending board 1371 and the contained angle between the main board 1370 the second extending board 1372 are substantially 90 degrees. Thus, the 90-degree bending design of the first extending board 1371 and the second extending board 1372 protects the locking bracket 137 from being deformed in the positive and the negative direction of the X-axis.

Likewise, as indicated in FIG. 4, the third extending board 1373 is extended from the third lateral side 1370c of the main board 1370, and the contained angle between the main board 1370 and the third extending board 1373 is substantially 90 degrees. Thus, the 90-degree bending design of the third extending board 1373 prevents the locking bracket 137 from being deformed in the positive and the negative direction of the Z-axis.

The main board 1370, the first extending board 1371, the second extending board 1372 and the third extending board 1373 are integrally formed in one piece. For example, these extending boards are formed by way of metallic casting, further enhancing the structural strength of the locking bracket 137.

During the process of assembly, the first extending board 1371 is directly screwed on the bottom board 131, and the two extending boards 1372 and the third extending board 1373 are also screwed on the host.

Figure 5:
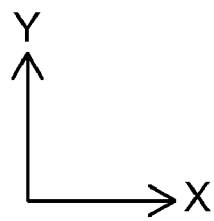
FIG. 5 shows a portable computer, a desktop and a power connecter.
Figure 5:
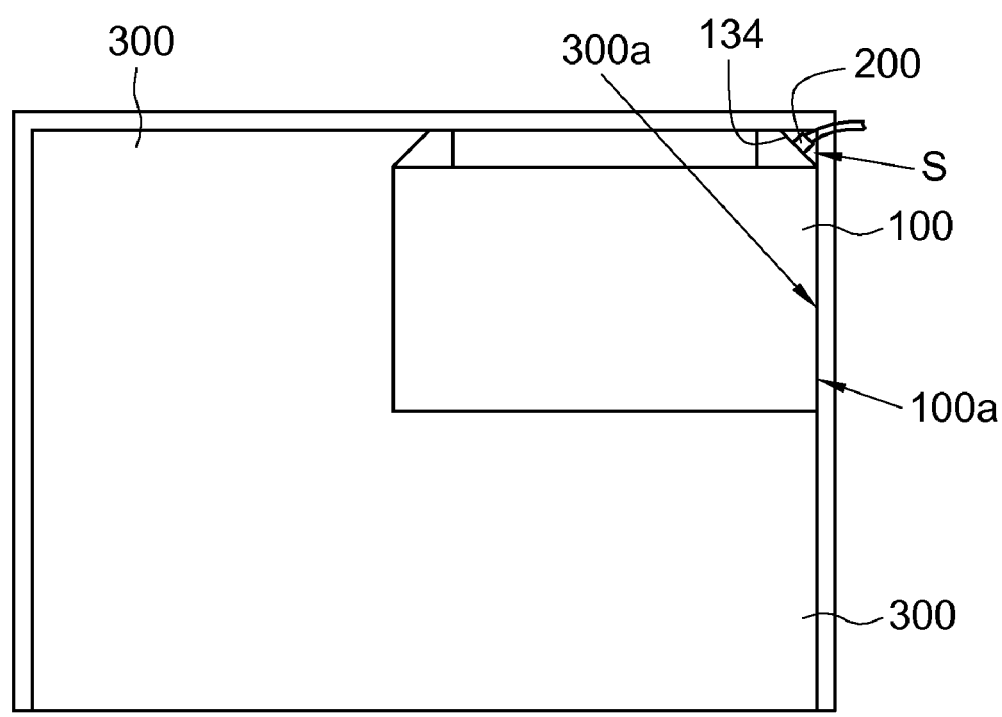

Referring to FIG. 5, a portable computer 100, a desktop 300 and a power connecter 200 are shown. As the slanting board 134 tilts 45 degrees with respect to the pivot 132 (the slanting board 134 and the pivot 132 are illustrated in FIG. 2), when the portable computer 100 is placed on a rectangular desktop 300, a space S is formed between the slanting board 134 and the corner of the desktop 300. The space S exactly receives the power connecter 200, so that the user can push a lateral side 100a of the portable computer 100 to a lateral side 300a of the desktop 300 and the utilization of space is maximized.

The portable computer and the hinge mechanism thereof disclosed in the above embodiments of the invention have many advantages exemplified as below.

1. When the first end of the pivot rotates with respect to the second end, the host and the bottom board will move together with the first end, and the display monitor will move together with the second end of the pivot. Thus, the display monitor can rotate around the host.

2. The sliding-rail structure is erected on the bottom board for disposing the power adapter. During the process of assembly, the two protrusion of the power adapter vertically slide into the sliding-rail structure, so that the power adapter is firmly disposed on the bottom board.

3. The first extending board, the second extending board, and the third extending board are respectively extended from the first lateral side, the second lateral side and the third lateral side of the main board. The contained angles between the main board and the first extending board, the second extending board and the third extending board are all substantially 90 degrees. Thus, the 90-degree bending design of the first extending board, the second extending board and the third extending board prevents the locking bracket from being deformed in the positive and the negative direction of the X-axis and the Z-axis.

4. The main board, the first extending board, the second extending board and the third extending board are integrally formed in one piece, further enhancing the structural strength of the locking bracket.

5. As the slanting board tilts 45 degrees with respect to the pivot, when the portable computer is placed on a rectangular desktop a space is formed between the slanting board and the corner of the desktop. The space exactly receives the power connecter, so that the user can push a lateral side of the portable computer to a lateral side of a rectangular desktop and the utilization of space is maximized.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable computer, comprising:
a display monitor;
a host; and a hinge mechanism connected with the display monitor and the host, wherein the hinge mechanism is for rotating the display monitor and the host relatively, and the hinge mechanism comprises:
- a bottom board;
- a pivot disposed on the bottom board, wherein one end of the pivot is connected with the host, and the other end of the pivot is connected with the display monitor;
- a power adapter disposed on the bottom board;
- a locking bracket disposed on the bottom board, wherein the locking bracket has a locking hole;
- a slanting board disposed on the bottom board and slanting to the pivot, wherein the slanting board has a first opening which exposes the power adapter; and
- a parallel board disposed on the bottom board and substantially parallel to the pivot, wherein the parallel board has a second opening which exposes the locking hole.

2. The portable computer according to claim 1, wherein the locking bracket comprises:
- a main board having the locking hole;
- a first extending board extended from a first lateral side of the main board;
- a second extending board extended from a second lateral side of the main board; and
- a third extending board extended from a third lateral side of the main board.

3. The portable computer according to claim 2, wherein a contained angle between the main board and the first extending board is substantially 90 degrees, the contained angle between the main board and the second extending board is substantially 90 degrees, and the contained angle between the main board and the third extending board is substantially 90 degrees.

4. The portable computer according to claim 2, wherein the main board, the first extending board, the second extending board and the third extending board are integrally formed in one piece.

5. The portable computer according to claim 2, wherein the main board and the parallel board are closed together.

6. The portable computer according to claim 2, wherein the first extending board is screwed on the bottom board, and the second extending board and the third extending board are screwed on the host.

7. The portable computer according to claim 1, wherein the hinge mechanism further comprises:
- two sliding-rail structures disposed on the bottom board for disposing the power adapter.

8. The portable computer according to claim 7, wherein the sliding-rail structures are erected on the bottom board.

9. The portable computer according to claim 1, wherein one end of the hinge is fixed on the bottom board, and the bottom board has a locking hole which is for screwing the host and the bottom board.

10. A hinge mechanism connected with a display monitor and a host of a portable computer, wherein the hinge mechanism is for rotating the display monitor and the host relatively, and the hinge mechanism comprises:
- a bottom board;
- a pivot disposed on the bottom board, wherein one end of the pivot is connected with the host, and the other end of the pivot is connected with the display monitor;
- a power adapter disposed on the bottom board;
- a locking bracket disposed on the bottom board, wherein the locking bracket has a locking hole;
- a slanting board disposed on the bottom board and slanting to the pivot, wherein the slanting board has an opening which exposes the power adapter; and
- a parallel board disposed on the bottom board and substantially parallel to the pivot, wherein the parallel board has a second opening which exposes the locking hole.

* * * * *